U. WEDGE.
HEATER.
APPLICATION FILED JAN. 4, 1913.

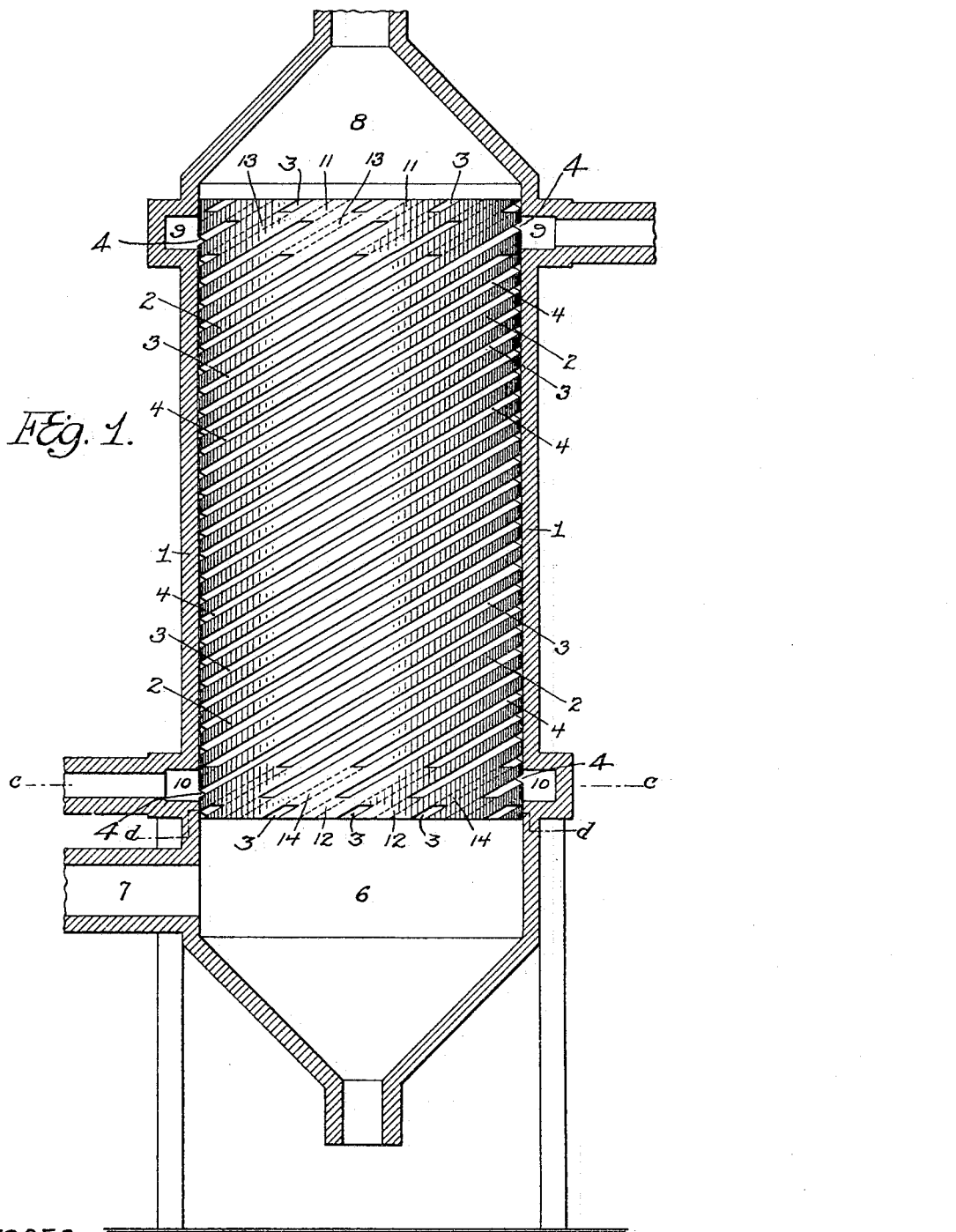

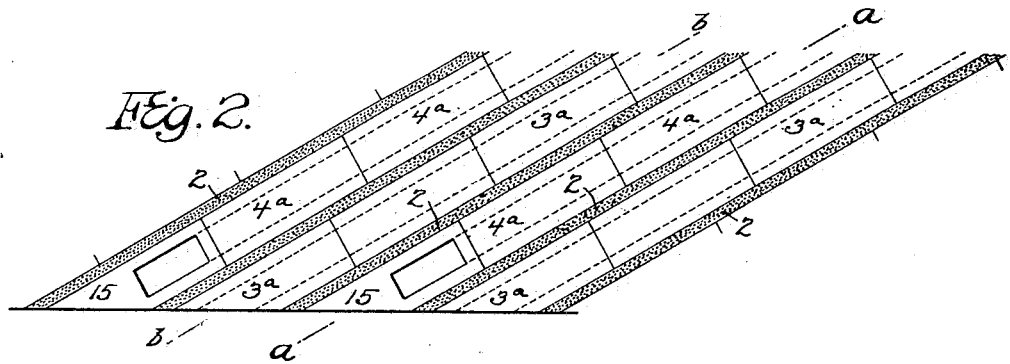
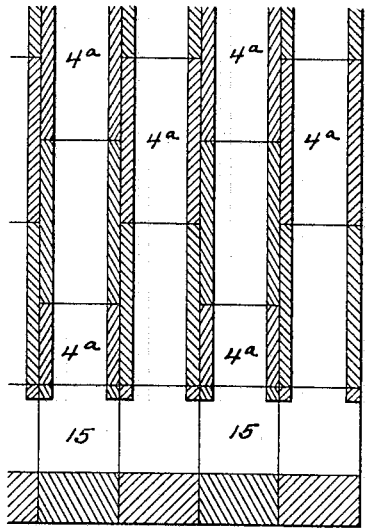

1,121,314.

Patented Dec. 15, 1914.
3 SHEETS—SHEET 3.

INVENTOR
UTLEY WEDGE
BY HIS ATTORNEY
Harry Smith

WITNESSES

UNITED STATES PATENT OFFICE.

UTLEY WEDGE, OF ARDMORE, PENNSYLVANIA.

HEATER.

1,121,314.  Specification of Letters Patent.  Patented Dec. 15, 1914.

Application filed January 4, 1913. Serial No. 740,105.

*To all whom it may concern:*

Be it known that I, UTLEY WEDGE, a citizen of the United States, residing in Ardmore, Pennsylvania, have invented certain Improvements in Heaters, of which the following is a specification.

The object of my invention is to provide means for quickly heating to a relatively high temperature large volumes of air, gas, or other fluid, hereinafter, for convenience, referred to as "air," the heater being intended mainly as an adjunct to a metallurgical furnace for whose effective operation such supplies of heated air are necessary.

Figure 4:
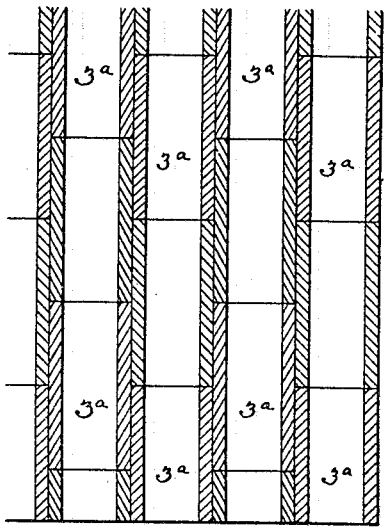
Figure 5:
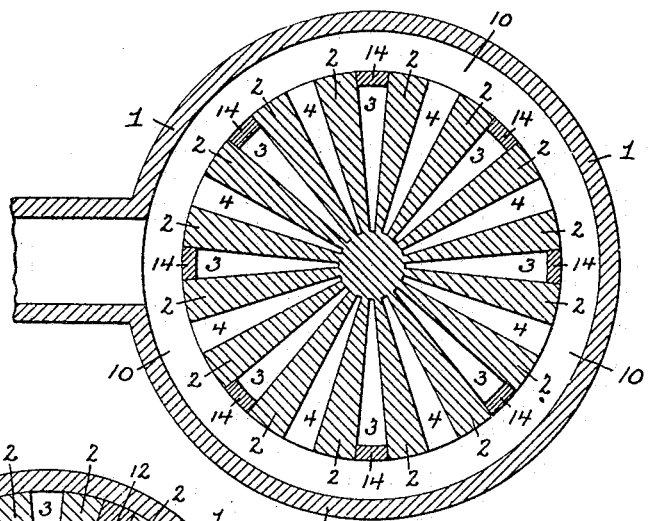
Figure 6:
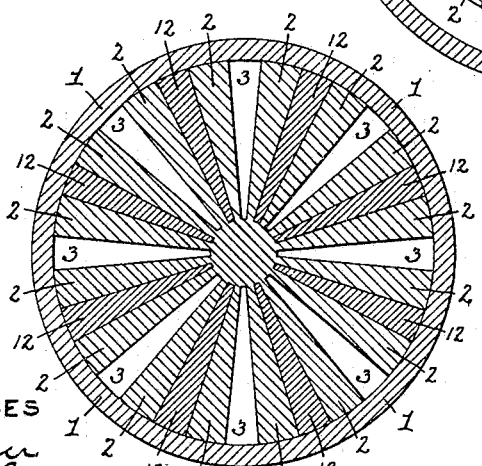

In the accompanying drawing Figure 1 is a view, partly in vertically section and partly in elevation, of a heater constructed in accordance with my invention, the front wall being removed in order to show the internal construction of the heater; Fig. 2 is a vertical sectional view of part of the heater showing a preferable construction of the same; Fig. 3 is a transverse section on the line $a$—$a$, Fig. 2; Fig. 4 is a similar section on the line $b$—$b$, Fig. 2; Fig. 5 is a horizontal section on the line $c$—$c$, Fig. 1, and Fig. 6 is a similar section on the line $d$—$d$, Fig. 1.

The structure comprises an outer wall 1, preferably circular in cross section, and containing a plurality of helical shelves 2 which alternate with helical chambers, every other one of the latter in the heater shown in the drawing being numbered 3 and the alternating chambers being numbered 4. The heater is mounted upon suitable supports above the foundation so as to permit a chamber 6, which communicates with a pipe or flue 7 for the introduction of heated products of combustion, the latter being derived from a gas, oil, coal, or other fuel burner, or, by preference, when the heater is used in combination with a metallurgical furnace, constituting the waste gases from such furnace. At the top of the heater is a hood 8 for receiving the waste gases and directing them to a suitable discharge stack. Encircling the upper and lower portions of the furnace shell are flues 9 and 10, the flue 9 communicating laterally with the upper ends of the helical chambers 4 of the heater and the flue 10 communicating laterally with the lower portions of said chambers 4, (Fig. 5) which are prevented from communicating at their upper ends with the interior of the hood 8 by means of filling plugs 11 and are likewise prevented from communicating at the bottom with the chamber 6 by similar filling plugs 12, (Fig. 6). The helical chambers 3 are open at top and bottom so as to communicate freely with the interior of the hood 8 and with the chamber 6 but these chambers 3 are prevented from communicating with the upper annular flue 9 by means of filling plugs 13 and are prevented from communicating at the bottom with the annular flue 10 by means of similar filling plugs 14, (Fig. 5). By reason of this construction the heated products of combustion from the chamber 6 are caused to pass upwardly through the chambers 3 and to escape therefrom into the chamber within the hood 8, and air forced into the upper annular flue 9 is caused to descend in the chambers 4 and to escape from the lower ends of said chambers into the annular flue 10, the air in its passage being highly heated by contact with the shelves 2 to which a high temperature has been imparted by reason of their contact with the heated products of combustion ascending the chambers 3.

Owing to the helical form of the shelves 2 they can, without risk of sagging or collapse, be made much thinner or lighter than horizontal shelves. When the heated products of combustion are supplied by the waste gases of the furnace the heater may also be caused to serve effectively as a means of separating from said gases the fine particles of solid material carried in suspension thereby and technically known as "flue dust," since the aggregate cross-sectional area of the chambers 3 may be so much greater than the area of the pipe or flue which supplies the gases to the chamber 6 as to very materially reduce the speed of flow of the gases in their upward passage through said chambers 3, so that the solid particles may be deposited by gravity upon the shelves 2 at the bottom of the passages 3, the angle of said shelves being such that the deposited matter will escape by gravity from the chambers 3 when the flow of gases through the same is cut off, or can be blown from said chambers when it is desired to clean the same.

The direction of travel of the air and products of combustion through the heater may be the reverse of that described, if desired, that is to say the air may travel upwardly through the chambers 4 and the products of combustion downwardly through the chambers 3, or both may travel in the same direction, travel in reverse directions being, of course, preferred in order that the volumes of air will be subjected to a progressively rising temperature.

In order to simplify and cheapen the construction of the heater it is preferable to lay up successive courses 3ᵃ and 4ᵃ of perforated bricks of refractory material, these courses being separated by courses 2 of cement mortar, which prevent admixture of the air and products of combustion. The mortar courses may be omitted if the bricks can be laid close together or so close that the joints will soon be sealed by the deposited flue dust. The perforations in the bricks of the course 3ᵃ provide longitudinal channels from top to bottom of the heater so as to communicate at the bottom with the chamber 6 and at the top with the interior of the hood 8, but the courses 4ᵃ have at top and bottom special bricks 15 with lateral passages therein, so that the longitudinal channels in said courses are prevented from communicating with the chamber 6 and hood 8, but are caused to communicate with the flue 9 or 10.

I claim:—

1. A heater having a plurality of helical shelves or partitions, and a corresponding plurality of helical chambers, in communication with a structure having a passage communicating laterally with one of said helical chambers and a passage communicating longitudinally with the other of said chambers.

2. The combination, in a heater, of successive helically disposed courses of perforated bricks, each providing a helical channel extending throughout the heater.

3. The combination, in a heater, of successive helically disposed courses of perforated bricks providing helical channels extending throughout the heater, the end bricks of certain of the courses having their channels extended to the ends of the bricks, and the end bricks of the other courses having their channels cut off from one end of the brick but having lateral passages extending from the channel to the sides of the brick.

4. The combination, in a heater, of a casing having means for supplying heated products of combustion at one end and means for carrying off said heated products of combustion at the other end, a plurality of helical shelves and a corresponding plurality of helical chambers within said casing, flues surrounding each end portion of the casing, means for permitting vertical and preventing lateral flow into or from the chambers of one series, and means for permitting lateral and preventing vertical flow into or from the chambers of the other series.

5. The combination, in a heater, of successive helically disposed courses of perforated bricks providing helical channels extending through the heater, with means for supplying products of combustion to the channels of certain of said courses, and means for supplying air to the channels of alternating courses.

6. The combination, in a heater, of successive helically disposed courses of perforated bricks providing helical channels extending through the heater, courses of mortar between the brick courses, means for supplying products of combustion to the channels of certain of the courses, and means for supplying air to the channels of alternating courses.

7. The combination, in a heater, of successive helically disposed courses of perforated bricks providing helical channels extending through the heater, means for supplying the channels of certain courses with products of combustion, means for supplying the channels of alternating courses with air, and means for preventing the channels of the air-receiving courses from communicating with the products of combustion channels, and vice-versa.

In testimony whereof, I have signed my name to this specification, in the presence of two subscribing witnesses.

UTLEY WEDGE.

Witnesses:
KATE A. BEADLE,
HAMILTON D. TURNER.

Copies of this patent may be obtained for five cents each, by addressing the "Commissioner of Patents, Washington, D. C."